(12) United States Patent

Gong et al.

(10) Patent No.: US 7,957,766 B2
(45) Date of Patent: Jun. 7, 2011

(54) METHOD FOR CONTROLLING A CAMERA MODE IN A PORTABLE TERMINAL

(75) Inventors: Sung-Hwa Gong, Gumi-si (KR);
Jong-Kerl Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/458,060

(22) Filed: Jun. 30, 2009

(65) Prior Publication Data

US 2009/0268077 A1    Oct. 29, 2009

Related U.S. Application Data

(62) Division of application No. 11/185,823, filed on Jul. 21, 2005.

(30) Foreign Application Priority Data

| Jul. 21, 2004 | (KR) | 2004-56885 |
| Jul. 21, 2004 | (KR) | 2004-56886 |
| Jul. 8, 2005 | (KR) | 2005-61582 |

(51) Int. Cl.
  *H04M 1/00* (2006.01)
(52) U.S. Cl. ............... 455/556.1; 455/550.1; 455/403; 455/575.1; 455/557; 455/556; 348/221.99; 348/14.01; 348/14.02; 348/207.99
(58) Field of Classification Search .............. 455/575.4, 455/550.1, 403, 575.1, 557, 556.1, 556; 348/211.99, 348/14.01, 14.02, 207.99
See application file for complete search history.

(56) References Cited

U.S. PATENT DOCUMENTS

| 6,950,126 | B1 | 9/2005 | Homma et al. |
| 7,265,779 | B2 | 9/2007 | Sato et al. |
| 2002/0057334 | A1 | 5/2002 | Mukai et al. |
| 2002/0067924 | A1 | 6/2002 | Yamazaki et al. |
| 2002/0118797 | A1 | 8/2002 | Masuda |
| 2002/0147033 | A1* | 10/2002 | Ban et al. .............. 455/566 |
| 2003/0013484 | A1 | 1/2003 | Nishimura et al. |
| 2004/0032503 | A1 | 2/2004 | Monden et al. |

(Continued)

FOREIGN PATENT DOCUMENTS

CN    1430401 A    7/2003

(Continued)

*Primary Examiner* — Kwasi Karikari
(74) *Attorney, Agent, or Firm* — Roylance, Abrams, Berdo & Goodman L.L.P.

(57) ABSTRACT

Disclosed is a camera control method for a portable terminal, by which a lens unit of a camera of the portable terminal can be automatically drawn into or out of the portable terminal when a call is received in a camera mode of the portable terminal. The method comprises the steps of: determining if a call is received in the camera mode in which a lens unit of the portable terminal has been drawn out of the portable terminal; controlling the lens unit to be automatically drawn into the portable terminal while reporting call reception when the call is received; shifting the portable terminal into a communication mode and performing communication when a communication key is input; shifting the portable terminal into an initial camera mode when the initial camera mode is selected after the communication is performed and shifting the portable terminal into a previous camera mode when the previous camera mode is selected after the communication is performed; and interrupting call reception and controlling the lens unit to be automatically drawn out of the portable terminal while maintaining the camera mode when a cancel key is selected.

6 Claims, 7 Drawing Sheets

U.S. PATENT DOCUMENTS

| | | |
|---|---|---|
| 2004/0097262 A1 | 5/2004 | Lee |
| 2004/0185921 A1* | 9/2004 | Tornaghi .................... 455/575.1 |
| 2004/0185922 A1* | 9/2004 | Sutton et al. ............... 455/575.1 |
| 2004/0259590 A1 | 12/2004 | Middleton |
| 2005/0009581 A1* | 1/2005 | Im et al. ..................... 455/575.4 |
| 2005/0049019 A1* | 3/2005 | Lee ............................ 455/575.4 |
| 2005/0052837 A1* | 3/2005 | Kota et al. ..................... 361/683 |
| 2005/0059438 A1* | 3/2005 | Jellicoe ...................... 455/575.1 |
| 2005/0137001 A1* | 6/2005 | Bell et al. ................... 455/575.4 |
| 2006/0135228 A1* | 6/2006 | Kato .......................... 455/575.4 |

FOREIGN PATENT DOCUMENTS

| | | |
|---|---|---|
| CN | 1466843 | 1/2004 |
| EP | 1414218 | 4/2004 |
| JP | 2000356798 | 12/2000 |
| JP | 2002277723 | 9/2002 |
| JP | 2003143273 | 5/2003 |
| JP | 2005156741 | 6/2005 |
| WO | WO9638762 | 12/1996 |

* cited by examiner

METHOD FOR CONTROLLING A CAMERA MODE IN A PORTABLE TERMINAL

PRIORITY

This application is a division of U.S. patent application Ser. No. 11/185,823, filed on Jul. 21, 2005, the entire disclosure of which is hereby incorporated by reference.

BACKGROUND OF THE INVENTION

1. Field of the Invention

The present invention relates to a camera control method for a portable terminal. More particularly, the present invention relates to a method for controlling a camera mode of a portable terminal, by which a lens unit of a camera of the portable terminal can be automatically drawn into or out of the portable terminal when a call is received in a camera mode of the portable terminal and movement of the lens unit and the sliding key input unit can be controlled.

2. Description of the Related Art

Portable or mobile communication terminals are currently being developed to support high speed data transmission in addition to a voice communication function. Specifically, by constructing a mobile communication network of the International Mobile Telecommunication (IMT) 2000, it is expected to be possible to realize high speed data transmission in addition to the voice communication function through a portable terminal. The data which can be processed by a portable terminal capable of performing the high speed data communication may include packet data and image data. Further, current portable terminals are equipped with a camera or a TV receiver so as to display a moving picture. Therefore, such a portable terminal having a camera can take and display either a moving picture or a still picture and can transmit the picture. Further, the portable terminal having a camera may have a zoom function in order to magnify or reduce an image prior to photographing the image.

The portable terminal having a zoom function usually has a lens unit which can be drawn into or out of the portable terminal. In a camera mode of the portable terminal, the lens unit is drawn out of the portable terminal and takes a picture. However, if a call is received while the portable terminal is in the camera mode, it is inevitable for the user to answer the call in the state where the lens unit has been drawn out or to do a manual operation to put the camera module into the terminal.

Further, there is a limit to the amount of magnification or reduction of an image by the zoom function of the portable terminal because the lens unit can move only within the camera. Moreover, while a user takes a picture by using the portable terminal having a camera, the user may press or input a key having no relation to the photographing operation and interrupt the photographing process.

SUMMARY OF THE INVENTION

Accordingly, the present invention has been made to solve the above-mentioned problems occurring in the prior art and to provider other advantages. An object of the present invention is to provide a camera control method for a portable terminal, by which a lens unit of a camera of the portable terminal can be automatically drawn into or out of the portable terminal when a call is received in a camera mode of the portable terminal.

It is another object of the present invention to provide a camera control method for a portable terminal, by which a lens unit of a camera of the portable terminal can be automatically drawn into the portable terminal when a communication key is input while a call is received in a camera mode of the portable terminal.

It is another object of the present invention to provide a camera control method for a portable terminal, in which a lens unit of a camera of the portable terminal is automatically drawn out of the portable terminal and the portable terminal mode is transitioned into the camera mode when the camera mode is selected after a call is received in the camera mode and communication is performed.

It is another object of the present invention to provide a camera control method for a portable terminal, in which a lens unit of a camera of the portable terminal is automatically drawn out of the portable terminal and the portable terminal mode is transitioned into the previous camera mode when the camera mode is selected after a call is received in the camera mode and communication is performed.

It is another object of the present invention to provide a camera control method for a portable terminal, by which a lens unit of a camera of the portable terminal can be automatically drawn out of the portable terminal when the portable terminal mode is transitioned into the camera mode.

It is another object of the present invention to provide a camera control method for a portable terminal, by which a lens unit of a camera of the portable terminal can be automatically drawn into the portable terminal when the camera mode is terminated.

It is another object of the present invention to provide a camera control method for a portable terminal, in which a lens unit of a camera of the portable terminal is automatically drawn out of the portable terminal and the camera mode is terminated when no operation is performed during a predetermined time interval in the camera mode.

It is another object of the present invention to provide a camera control method for a portable terminal, in which a lens unit of a camera of the portable terminal is automatically drawn out of the portable terminal when no operation is performed during a predetermined time interval in the camera mode.

It is another object of the present invention to provide a camera control method for a portable terminal, in which only keys for a camera operation are activated when a sliding key input unit is closed and all keys are activated when a sliding key input unit is open in a camera mode of the portable terminal.

In order to accomplish this object, there is provided a method for controlling a camera mode of a portable terminal, the method comprising the steps of determining if a call is received in the camera mode in which a lens unit of the portable terminal has been drawn out of the portable terminal; and controlling the lens unit to be automatically drawn into the portable terminal while reporting call reception when the call is received.

In accordance with another aspect of the present invention, there is provided a method for controlling a camera mode of a portable terminal. The method comprising the steps of determining if a call is received in the camera mode in which a lens unit of the portable terminal has been drawn out of the portable terminal; controlling the lens unit to be automatically drawn into the portable terminal while reporting a call reception when the call is received; shifting the portable terminal into a communication mode and performing communication when a communication key is input; and controlling the lens unit to be automatically drawn out of the portable terminal and shifting the portable terminal into an initial camera mode when the camera mode is selected after the communication is performed.

In accordance with another aspect of the present invention, there is provided a method for controlling a camera mode of a portable terminal. The method comprising the steps of determining if a call is received in the camera mode in which a lens unit of the portable terminal has been drawn out of the portable terminal; controlling the lens unit to be automatically drawn into the portable terminal while reporting a call reception when the call is received; shifting the portable terminal into a communication mode and performing communication when a communication key is input; and controlling the lens unit to be automatically drawn out of the portable terminal and shifting the portable terminal into a previous camera mode when the camera mode is selected after the communication is performed.

In accordance with another aspect of the present invention, there is provided a method for controlling a camera mode of a portable terminal. The method comprising the steps of determining if a call is received in the camera mode in which a lens unit of the portable terminal has been drawn out of the portable terminal; controlling the lens unit to be automatically drawn into the portable terminal while reporting a call reception when the call is received; shifting the portable terminal into a communication mode and performing communication when a communication key is input; selecting the camera mode while assigning a type of camera mode after the communication is performed; shifting the portable terminal into an initial camera mode when the assigned type of camera mode is the initial camera mode; and shifting the portable terminal into a previous camera mode when the assigned type of camera mode is the previous camera mode.

In accordance with another aspect of the present invention, there is provided a method for controlling a camera mode of a portable terminal. The method comprising the steps of: determining if a call is received in the camera mode in which a lens unit of the portable terminal has been drawn out of the portable terminal; controlling the lens unit to be automatically drawn into the portable terminal while reporting a call reception when the call is received; shifting the portable terminal into a communication mode and performing communication when a communication key is input; controlling the lens unit to be automatically drawn out of the portable terminal and shifting the portable terminal into an initial camera mode when the camera mode is selected after the communication is performed; and interrupting call reception and controlling the lens unit to be automatically drawn out of the portable terminal while maintaining the camera mode when a cancel key is selected.

In accordance with another aspect of the present invention, there is provided a method for controlling a camera mode of a portable terminal. The method comprising the steps of determining if a call is received in the camera mode in which a lens unit of the portable terminal has been drawn out of the portable terminal; controlling the lens unit to be automatically drawn into the portable terminal while reporting a call reception when the call is received; shifting the portable terminal into a communication mode and performing communication when a communication key is input; controlling the lens unit to be automatically drawn out of the portable terminal and shifting the portable terminal into a previous camera mode when the camera mode is selected after the communication is performed; and interrupting call reception and controlling the lens unit to be automatically drawn out of the portable terminal while maintaining the camera mode when a cancel key is selected.

In accordance with another aspect of the present invention, there is provided a method for controlling a camera mode of a portable terminal. The method comprising the steps of determining if a call is received in the camera mode in which a lens unit of the portable terminal has been drawn out of the portable terminal; controlling the lens unit to be automatically drawn into the portable terminal while reporting call reception when the call is received; shifting the portable terminal into a communication mode and performing communication when a communication key is input; shifting the portable terminal into an initial camera mode when the initial camera mode is selected after the communication is performed and shifting the portable terminal into a previous camera mode when the previous camera mode is selected after the communication is performed; and interrupting call reception and controlling the lens unit to be automatically drawn out of the portable terminal while maintaining the camera mode when a cancel key is selected.

In accordance with another aspect of the present invention, there is provided a method for controlling a camera mode of a portable terminal. The method comprising the steps of determining if a call is received in the camera mode in which a lens unit of the portable terminal has been drawn out of the portable terminal; reporting a call reception when the call is received; and controlling the lens unit to be automatically drawn into the portable terminal and shifting the portable terminal into a communication mode when a communication key is input while the call is received.

In accordance with another aspect of the present invention, there is provided a method for controlling a camera mode of a portable terminal. The method comprising the steps of determining if a call is received in the camera mode in which a lens unit of the portable terminal has been drawn out of the portable terminal; reporting a call reception when the call is received; controlling the lens unit to be automatically drawn into the portable terminal, shifting the portable terminal into a communication mode, and performing communication, when a communication key is input while the call is received; and controlling the lens unit to be automatically drawn out of the portable terminal and shifting the portable terminal into an initial camera mode when the camera mode is selected after the communication is performed.

In accordance with another aspect of the present invention, there is provided a method for controlling a camera mode of a portable terminal. The method comprising the steps of determining if a call is received in the camera mode in which a lens unit of the portable terminal has been drawn out of the portable terminal; reporting a call reception when the call is received; controlling the lens unit to be automatically drawn into the portable terminal, shifting the portable terminal into a communication mode, and performing communication, when a communication key is input while the call is received; and controlling the lens unit to be automatically drawn out of the portable terminal and shifting the portable terminal into a previous camera mode when the camera mode is selected after the communication is performed.

In accordance with another aspect of the present invention, there is provided a method for controlling a camera mode of a portable terminal. The method comprising the steps of determining if a call is received in the camera mode in which a lens unit of the portable terminal has been drawn out of the portable terminal; reporting a call reception when the call is received; controlling the lens unit to be automatically drawn into the portable terminal, shifting the portable terminal into a communication mode, and performing communication, when a communication key is input while the call is received; selecting the camera mode while assigning a type of the camera mode after the communication is performed; shifting the portable terminal into an initial camera mode when the assigned type of camera mode is the initial camera mode; and shifting the portable terminal into a previous camera mode when the assigned type of camera mode is the previous camera mode.

In accordance with another aspect of the present invention, there is provided a method for controlling a camera mode of a portable terminal. The method comprising the steps of determining if a call is received in the camera mode in which a lens unit of the portable terminal has been drawn out of the portable terminal; reporting a call reception when the call is received; controlling the lens unit to be automatically drawn into the portable terminal, shifting the portable terminal into a communication mode, and performing communication, when a communication key is input; controlling the lens unit to be automatically drawn out of the portable terminal and shifting the portable terminal into an initial camera mode when the camera mode is selected after the communication is performed; and interrupting the call reception and maintaining the camera mode when a cancel key is selected.

In accordance with another aspect of the present invention, there is provided a method for controlling a camera mode of a portable terminal. The method comprising the steps of determining if a call is received in the camera mode in which a lens unit of the portable terminal has been drawn out of the portable terminal; reporting a call reception when the call is received; controlling the lens unit to be automatically drawn into the portable terminal, shifting the portable terminal into a communication mode, and performing communication, when a communication key is input; controlling the lens unit to be automatically drawn out of the portable terminal and shifting the portable terminal into a previous camera mode when the camera mode is selected after the communication is performed; and interrupting the call reception and maintaining the camera mode when a cancel key is selected.

In accordance with another aspect of the present invention, there is provided a method for controlling a camera mode of a portable terminal. The method comprising the steps of determining if a call is received in the camera mode in which a lens unit of the portable terminal has been drawn out of the portable terminal; reporting a call reception when the call is received; controlling the lens unit to be automatically drawn into the portable terminal, shifting the portable terminal into a communication mode, and performing communication, when a communication key is input; shifting the portable terminal into an initial camera mode when the initial camera mode is selected after the communication is performed and shifting the portable terminal into a previous camera mode when the previous camera mode is selected after the communication is performed; and interrupting the call reception and maintaining the camera mode when a cancel key is selected.

In accordance with another aspect of the present invention, there is provided a method for controlling a camera mode of a portable terminal. The method comprising the steps of controlling the lens unit to be automatically drawn out of the portable terminal when the portable terminal mode is transitioned into the camera mode; and controlling the lens unit to be automatically drawn into the portable terminal when the camera mode is terminated.

In accordance with another aspect of the present invention, there is provided a method for controlling a camera mode of a portable terminal. The method comprising the steps of controlling the lens unit to be automatically drawn out of the portable terminal when the portable terminal mode is transitioned into the camera mode; and interrupting the camera mode and controlling the lens unit to be automatically drawn into the portable terminal when no operation is performed during a predetermined time interval in the camera mode.

In accordance with another aspect of the present invention, there is provided a method for controlling a camera mode of a portable terminal. The method comprising the steps of controlling the lens unit to be automatically drawn out of the portable terminal when the portable terminal mode is transitioned into the camera mode; interrupting the camera mode and controlling the lens unit to be automatically drawn into the portable terminal when no operation is performed during a predetermined time interval in the camera mode; and controlling the lens unit to be automatically drawn into the portable terminal when a camera-mode-end key is selected in the camera mode.

In accordance with another aspect of the present invention, there is provided a method for controlling a camera mode of a portable terminal, the method comprising the steps of: controlling the lens unit to be automatically drawn out of the portable terminal when the portable terminal mode is transitioned into the camera mode; and controlling the lens unit to be automatically drawn into the portable terminal while maintaining the camera mode when no operation is performed during a predetermined time interval in the camera mode.

In accordance with another aspect of the present invention, there is provided a method for controlling a camera mode of a portable terminal. The method comprising the steps of controlling the lens unit to be automatically drawn out of the portable terminal when the portable terminal mode is transitioned into the camera mode; controlling the lens unit to be automatically drawn into the portable terminal while maintaining the camera mode when no operation is performed during a predetermined time interval in the camera mode; and controlling the lens unit to be automatically drawn into the portable terminal when a camera-mode-end key is selected in the camera mode.

In accordance with another aspect of the present invention, there is provided a method for controlling a camera mode of a portable terminal. The method comprising the steps of determining a status of a sliding key input unit of the portable terminal when the portable terminal mode is transitioned into the camera mode; activating only keys for a camera operation when the sliding key input unit is closed; and activating all keys when the sliding key input unit is open.

In accordance with another aspect of the present invention, there is provided a method for controlling a camera mode of a portable terminal. The method comprising the steps of controlling the lens unit to be automatically drawn out of the portable terminal when the portable terminal mode is transitioned into the camera mode; and determining a status of a sliding key input unit of the portable terminal when the portable terminal mode is transitioned into the camera mode; activating only keys for a camera operation when the sliding key input unit is closed; activating all keys when the sliding key input unit is open; and controlling the lens unit to be automatically drawn into the portable terminal when the camera mode is terminated.

In accordance with another aspect of the present invention, there is provided a method for controlling a camera mode of a portable terminal. The method comprising the steps of controlling the lens unit to be automatically drawn out of the portable terminal when the portable terminal mode is transitioned into the camera mode; determining a status of a sliding key input unit of the portable terminal; activating only keys for a camera operation when the sliding key input unit is closed; activating all keys when the sliding key input unit is open; and interrupting the camera mode and controlling the lens unit to be automatically drawn into the portable terminal when no operation is performed during a predetermined time interval in the camera mode.

In accordance with another aspect of the present invention, there is provided a method for controlling a camera mode of a portable terminal. The method comprising the steps of controlling the lens unit to be automatically drawn out of the portable terminal when the portable terminal mode is transitioned into the camera mode; determining a status of a sliding key input unit of the portable terminal; activating only keys for a camera operation when the sliding key input unit is closed; activating all keys when the sliding key input unit is open; interrupting the camera mode and controlling the lens unit to be automatically drawn into the portable terminal when no operation is performed during a predetermined time interval in the camera mode; and controlling the lens unit to be automatically drawn into the portable terminal when a camera-mode-end key is selected in the camera mode.

In accordance with another aspect of the present invention, there is provided a method for controlling a camera mode of a portable terminal. The method comprising the steps of controlling the lens unit to be automatically drawn out of the portable terminal when the portable terminal mode is transitioned into the camera mode; determining a status of a sliding key input unit of the portable terminal; activating only keys for a camera operation when the sliding key input unit is closed; activating all keys when the sliding key input unit is open; and controlling the lens unit to be automatically drawn into the portable terminal while maintaining the camera mode when no operation is performed during a predetermined time interval in the camera mode.

In accordance with another aspect of the present invention, there is provided a method for controlling a camera mode of a portable terminal. The method comprising the steps of controlling the lens unit to be automatically drawn out of the portable terminal when the portable terminal mode is transitioned into the camera mode; determining a status of a sliding key input unit of the portable terminal; activating only keys for a camera operation when the sliding key input unit is closed; activating all keys when the sliding key input unit is open; controlling the lens unit to be automatically drawn into the portable terminal while maintaining the camera mode when no operation is performed during a predetermined time interval in the camera mode; and controlling the lens unit to be automatically drawn into the portable terminal when a camera-mode-end key is selected in the camera mode.

BRIEF DESCRIPTION OF THE DRAWINGS

The above and other objects, features and advantages of the present invention will be more apparent from the following detailed description taken in conjunction with the accompanying drawings, in which.

Throughout the drawings, the same or similar elements, features and structures are represented by the same reference numerals.

DETAILED DESCRIPTION OF EXEMPLARY EMBODIMENTS

Hereinafter, embodiments of the present invention will be described with reference to the accompanying drawings.

Figure 1:
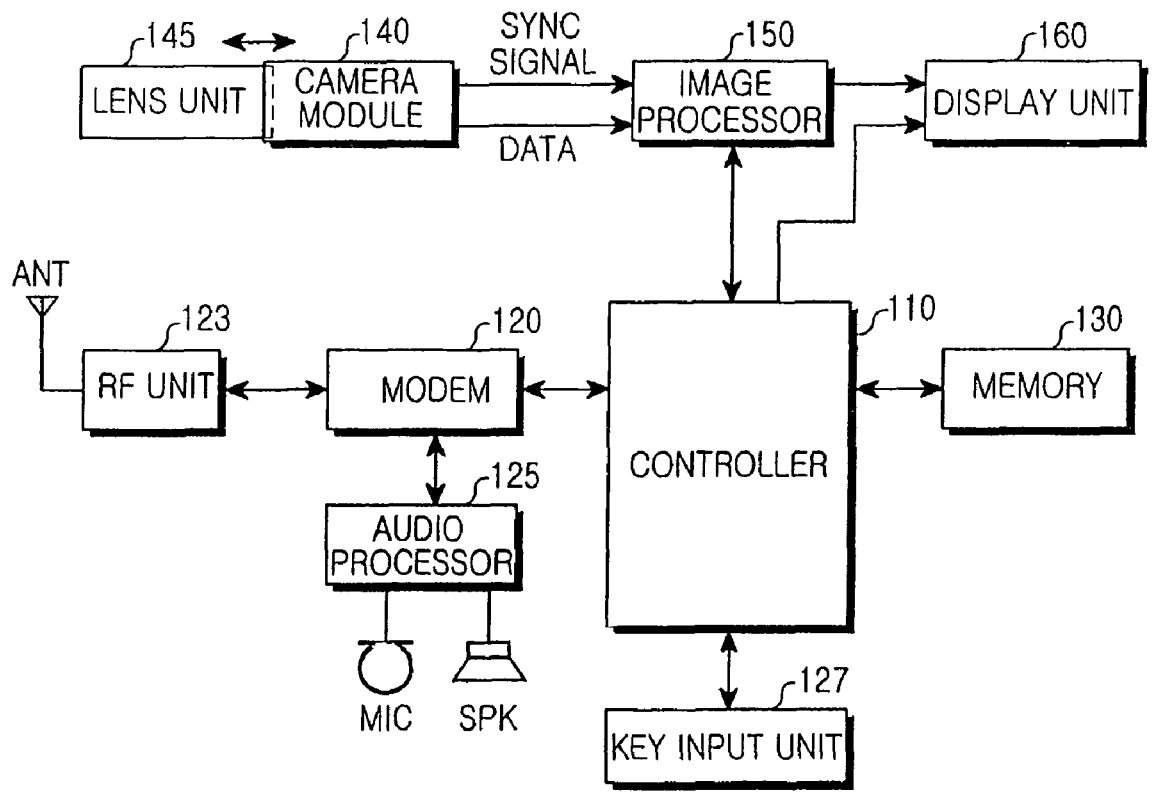
FIG. 1 is a block diagram illustrating a portable terminal having a camera according to an embodiment of the present invention.

FIG. 1 is a block diagram illustrating a portable terminal having a camera according to an embodiment of the present invention.

In the portable terminal shown in FIG. 1, a radio frequency (RF) unit 123 performs a wireless communication function. The RF unit 123 comprises a RF transmitter (not shown) for upconverting the frequency of a transmitted signal and amplifying the transmitted signal and an RF receiver (not shown) for low noise-amplifying a received signal and downconverting a frequency of the received signal. A modem 120 comprises a transmitter (not shown) for coding and modulating the transmitted signal and a receiver (not shown) for demodulating and decoding the received signal. An audio processor 125 may have a codec which comprises a data codec (not shown) for processing packet data, and the like and an audio codec (not shown) for processing an audio signal such as voice. The audio processor 125 converts a digital audio signal received from the modem 120 into an analog signal by using the audio codec and then reproduces the converted analog signal through a speaker or converts an analog signal generated by a microphone into a digital audio signal by using the audio codec and then transmits the converted digital signal to the modem 120. The codec may be either separately provided or integrated into the controller 110.

A memory 130 may comprise a program memory, a data memory, and so on. The program memory may store programs for controlling general operations of the portable terminal. The memory 130 may store programs for controlling the lens unit according to a call reception in a camera mode according to an embodiment of the present invention and programs for controlling the lens unit 145 and the sliding key input unit in the camera mode. Further, the data memory temporarily stores data produced during execution of the programs as described above.

The controller 110 controls general operations of the portable terminal. Further, the controller 110 may comprise the modem 120 and a codec. Further, when a call is received in the camera mode, the controller 110 controls the lens unit to be automatically drawn into the portable terminal while reporting the call reception. When the user selects a cancel key after receiving a report of a call reception in the camera mode, the controller 110 interrupts the call reception and controls the retracted lens unit to be automatically drawn out while maintaining the camera mode. When the user selects a communication key after receiving a report of a call reception in the camera mode, the controller 110 controls the protruded lens unit to be automatically retracted into the wireless terminal. When the user selects the cancel key, the controller 110 interrupts the call reception and maintains the camera mode. When the user selects a camera mode after performing the communication, the controller 110 changes the mode of the portable terminal to an initial camera mode or a previous camera mode.

According to an embodiment of the present invention, the controller 110 controls the lens unit 145 to be automatically drawn into or out of the portable terminal whenever a mode transition into or termination of the camera mode occurs. Also, when there is no operation in the camera mode during a predetermined time interval, the controller 110 may end the camera mode and controls the lens unit 145 to be automatically drawn into the portable terminal. The controller 110 may maintain the camera mode while controlling the lens unit 145 to be automatically drawn into the portable terminal, when there is no operation in the camera mode during a predetermined time interval. Further, according to an embodiment of the present invention, when the sliding key input unit is closed in the camera mode, the controller 110 activates only the keys for the camera function. When the sliding key input unit is open in the camera mode, the controller 110 activates all of the keys.

The camera module 140 comprises a lens unit 145 which can be drawn into or out of the portable terminal and takes an image data through the lens unit 145. The camera module 140 comprises a camera sensor (not shown) for converting a captured optical signal into an electrical signal and a signal processor for converting the analog image signal supplied from the camera sensor into a digital data. The camera sensor may be a Charge Coupled Device (CCD) sensor and the signal processor may be a Digital Signal Processor (DSP). Further, the camera sensor and the signal processor may be either included in one integrated device or separately arranged.

An image processor 150 generates a screen data in order to display the image signal output from the camera module 140. The image processor 150 processes by the frame the image signal output from the camera module 140 and outputs the frame image data in accordance with the characteristics and the size of the display unit 160. Further, the image processor 150 comprises an image codec by which the image processor 150 compresses the frame image data displayed on the display unit 160 according to a predetermined scheme or restores the compressed image data to the original frame image data. The image codec may be a Joint Picture Experts Group (JPEG) codec, a Moving Picture Experts Group 4 (MPEG4) codec, a Wavelet codec, and so on. It is assumed that the image processor 150 has an On Screen Display (OSD) function by which the image processor 150 can output OSD data according to the size of the screen under the control of the controller 110.

A display unit 160 receives an image signal from the image processor 150 and displays an image corresponding to the image signal and user data output from the controller 110 on a screen. Here, the display unit 160 may be a Liquid Crystal Display (LCD) unit which comprises a LCD controller, a memory capable of storing an image data, an LCD device, and so on. When the LCD is a touch screen type LCD, the LCD unit may function as an input unit.

The key input unit 127 comprises keys for the input of number and character information and function keys for setting up of various functions. The key input unit 127 according to an embodiment of the present invention comprises a fixed sliding key input unit and a sliding key input unit. When the sliding key input unit has slid and been opened, the keys of the sliding key input and the fixed key input unit located under the sliding key input unit are activated. When the sliding key input unit has slid and been closed, only predetermined keys of the sliding key input unit can be used. Hereinafter, an operation for controlling the lens unit according to a call reception in the camera mode of the portable terminal will be described in detail with reference to FIGS. 2 through 4.

Further, an operation for controlling the lens unit and the sliding key input unit in the camera mode of the portable terminal will be described in detail with reference to FIGS. 5 through 7.

Figure 2:
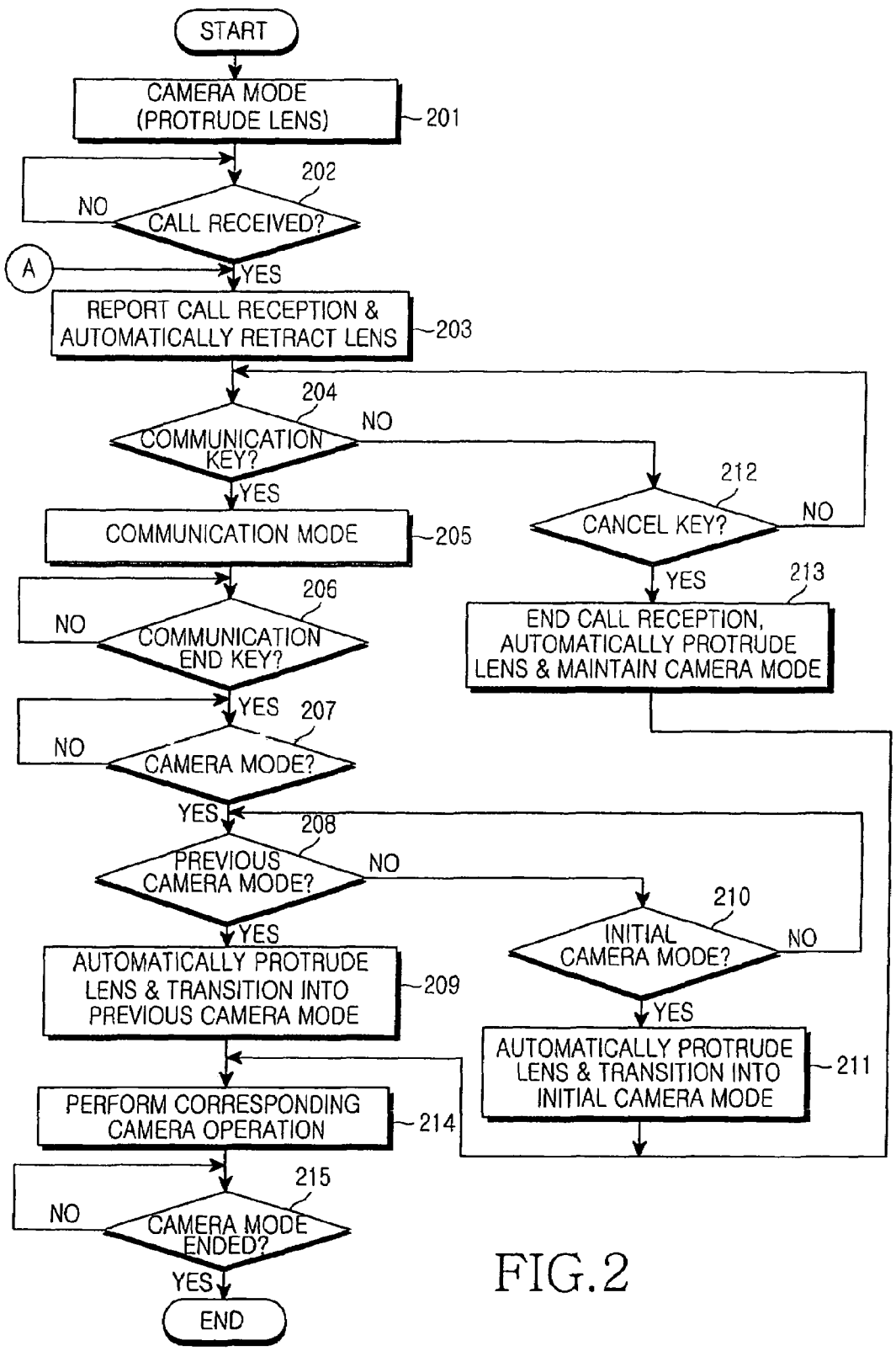
FIG. 2 is a flowchart of a method for controlling the lens unit in the camera mode of the portable terminal according to the first embodiment of the present invention when a call is received.

FIG. 2 is a flowchart of a method for controlling the lens unit in the camera mode of the portable terminal according to a first embodiment of the present invention when a call is received.

In the following description about the first embodiment of the present invention, reference will be made to FIG. 1.

Referring to FIG. 2, when the user of the portable terminal selects a photographing key on the menu or inputs a hot key for the camera mode for more than a predetermined time interval, the controller 110 detects the selection of the camera mode, controls the lens unit 145 to be automatically drawn out of the portable terminal, and changes the mode of the portable terminal into the camera mode at step 201.

When a call is received in the camera mode, the controller 110 detects the call reception at step 202 and reports the call reception and automatically draws the lens unit 145 into the portable terminal at step 203. At step 203, the controller 110 may temporarily interrupt the camera mode and report the call reception by outputting an audible alarm or displaying a message.

When the user inputs a communication key, the controller 110 detects the key input at step 204 and changes the mode of the terminal into the communication mode at step 205. When the user inputs a communication completion key after performing the communication, the controller 110 detects the completion of the communication and changes the mode of the terminal into a waiting mode at step 206. When the user selects the camera mode while in the waiting mode, the controller 110 detects the selection at step 207 and changes the mode of the terminal into the camera mode. Then, the portable terminal enters into the initial camera mode, the previous camera mode, or a selected camera mode. When the user selects the previous camera mode, the controller 110 detects the selection at step 208 and proceeds to step 209. At step 209, the controller 110 controls the lens unit 145 to be automatically drawn out and changes the mode of the portable terminal to the previous camera mode in which the portable terminal is set up in the same manner as in the previous camera mode. When the user selects the initial camera mode, the controller 110 detects the selection at step 210 and changes the mode of the terminal to the initial camera mode at step 211. In the previous camera mode or initial camera mode, the controller 110 performs the corresponding camera operation according to the user's key input operation at step 214. When the user inputs the camera-mode-end key, the controller detects the key input at step 215 and ends the camera mode.

However, when the user inputs the cancel key while the call is received, the controller 110 detects the key input at step 212 and proceeds to step 213. At step 213, the controller 110 interrupts the call reception and controls the lens unit 145 to be automatically drawn out of the terminal while maintaining the camera mode. Then, the controller 110 performs the corresponding camera operation according to the user's key input operation at step 214. When the user inputs the camera-mode-end key, the controller detects the key input at step 215 and ends the camera mode.

Figure 3:
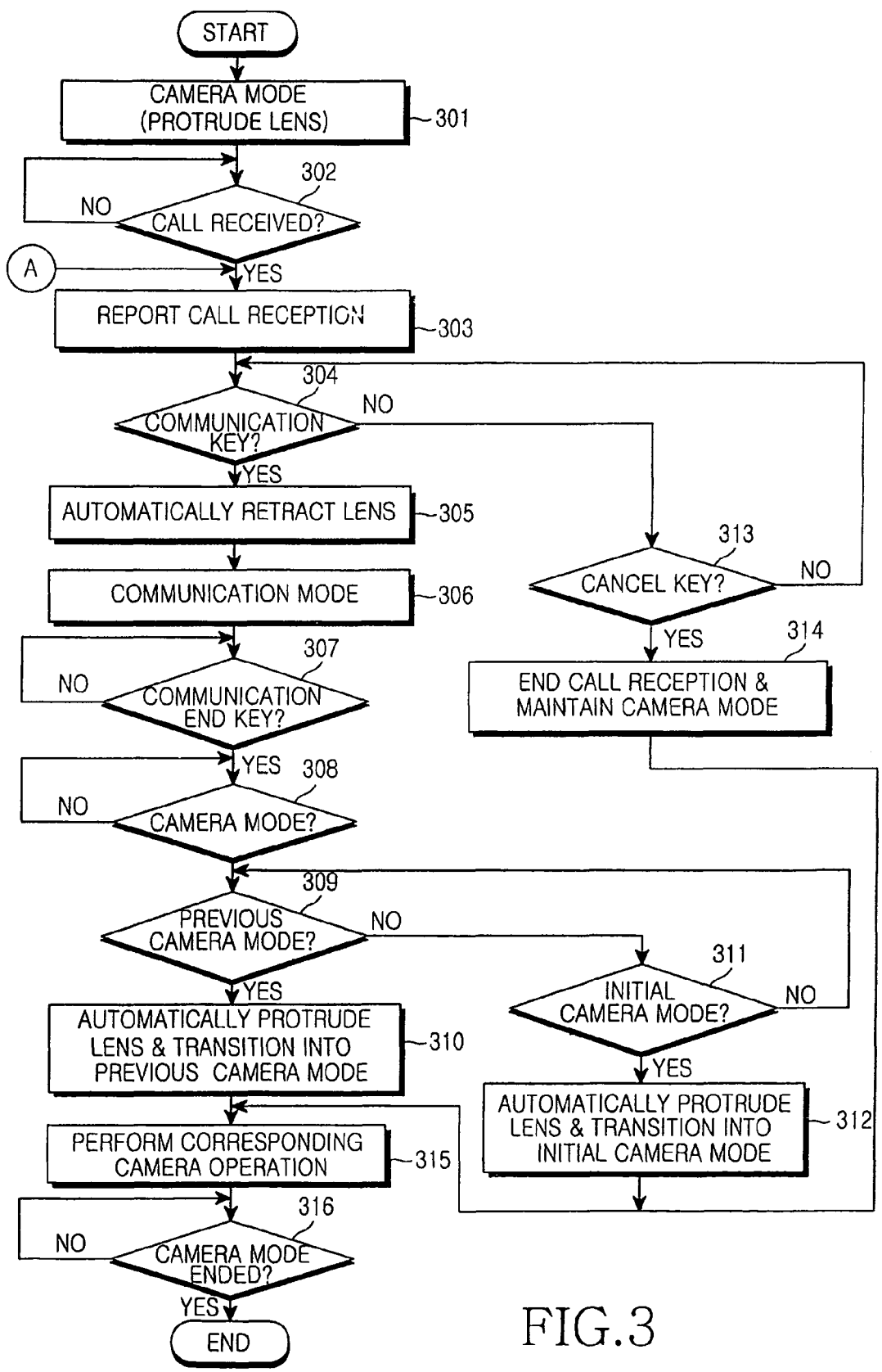
FIG. 3 is a flowchart of a method for controlling the lens unit in the camera mode of the portable terminal according to the second embodiment of the present invention when a call is received.

FIG. 3 is a flowchart of a method for controlling the lens unit in the camera mode of the portable terminal according to the second embodiment of the present invention when a call is received.

In the following description on the second embodiment of the present invention, reference will also be made to FIG. 1.

Referring to FIG. 3, when the user of the portable terminal selects a photographing key on the menu or inputs a hot key for the camera mode for at least a predetermined time interval, the controller 110 detects the selection of the camera mode, controls the lens unit 145 to be automatically drawn out of the portable terminal, and changes the mode of the portable terminal into the camera mode at step 301.

When a call is received in the camera mode, the controller 110 detects the call reception at step 302 and reports the call reception at step 303. At step 303, the controller 110 may temporarily interrupt the camera mode and report the call reception by outputting an audible alarm or displaying a message.

When the user inputs a communication key, the controller 110 detects the key input at step 304, controls the lens unit 145 to be automatically drawn into the terminal at step 305, and changes the mode of the terminal into the communication mode at step 306. When the user inputs a communication completion key after performing the communication, the controller 110 detects the completion of the communication, ends the communication mode, and changes the mode of the terminal into the waiting mode at step 307. When the user selects the camera mode while in the waiting mode, the controller 110 detects the selection at step 308 and changes the mode of the terminal into the camera mode. Then, the portable terminal enters into the initial camera mode, the previous camera mode, or a selected camera mode. When the user selects the previous camera mode, the controller 110 detects the selection at step 309 and proceeds to step 310. At step 310, the controller 110 controls the lens unit 145 to be automatically drawn out and changes the mode of the portable terminal to the previous camera mode in which the portable terminal is set up in the same manner as in the previous camera mode. When the user selects the initial camera mode, the controller 110 detects the selection at step 311 and changes the mode of the terminal to the initial camera mode at step 312. In the previous camera mode or initial camera mode, the controller 110 performs the corresponding camera operation according to the user's key input operation at step 315. When the user inputs the camera-mode-end key, the controller detects the key input at step 316 and ends the camera mode.

However, when the user inputs the cancel key while the call is received, the controller 110 detects the key input at step 313 and proceeds to step 314. At step 314, the controller 110 interrupts the call reception and maintains the camera mode. Then, the controller 110 performs the corresponding camera operation according to the user's key input operation at step 315. When the user inputs the camera-mode-end key, the controller detects the key input at step 316 and ends the camera mode.

Figure 4:
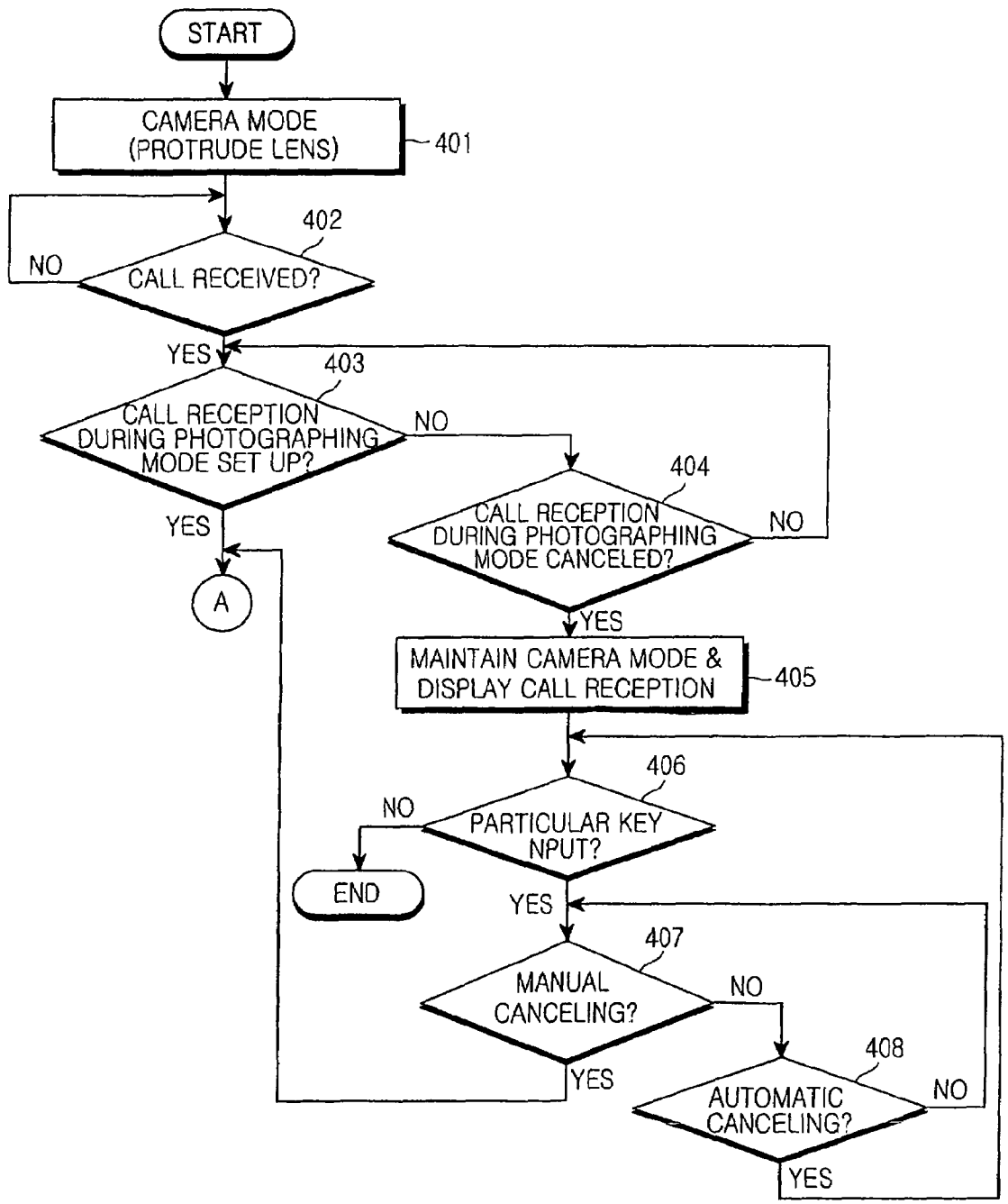
FIG. 4 is a flowchart of a method for controlling the lens unit in the camera mode of the portable terminal according to another embodiment of the present invention when a call is received.

FIG. 4 is a flowchart of a method for controlling the lens unit in the camera mode of the portable terminal according to another embodiment of the present invention when a call is received.

In the following description, reference will also be made to FIG. 1.

When the user of the portable terminal selects a photographing key on the menu or inputs a hot key for the camera mode for at least a predetermined time interval, the controller 110 detects the selection of the camera mode, controls the lens unit 145 to be automatically drawn out of the portable terminal, and changes the mode of the portable terminal into the camera mode at step 401.

When a call is received in the camera mode, the controller 110 detects the call reception at step 402 and determines if an answering-during-photographing mode has been set up at step 403.

When the answering-during-photographing mode has been set up in the portable terminal, the controller 110 detects the setup of the answering-during-photographing mode at step 403 and proceeds to step 203 of FIG. 2 or step 303 of FIG. 3.

However, when the answering-during-photographing mode has been canceled in the portable terminal, the controller 110 detects the cancellation of the answering-during-photographing mode at step 404 and displays the call reception while maintaining the camera mode in which the lens unit 145 has been drawn out at step 405. At step 405, the controller 110 reports the call reception by controlling the display unit 160 to display a message reporting the call reception (e.g. caller's information) on a predetermined part of the screen displaying the image data input through the protruded lens unit 145. At step 405, the keys for communication (e.g. the communication key) are deactivated.

When a particular key is input at step 405, the controller 110 detects the key input at step 406 and determines the type of canceling set up in order to cancel the answering-during-photographing mode. In this case, the particular key may be input for more than a predetermined time interval, so that the corresponding function can be performed.

When the type of canceling set up in order to cancel the answering-during-photographing mode is manual canceling, the controller 110 detects it at step 407 and proceeds to step 203 of FIG. 2 or step 303 of FIG. 3. However, when the type of canceling set up in order to cancel the answering-during-photographing mode is automatic canceling, the controller 110 detects it at step 408 and maintains the camera mode in which the lens unit 145 has been drawn out while displaying the call reception as in step 405.

Instead, when a particular key is input at step 405, the controller 110 detects the key input and may proceed to step 203 of FIG. 2 or step 303 of FIG. 3.

Figure 5:
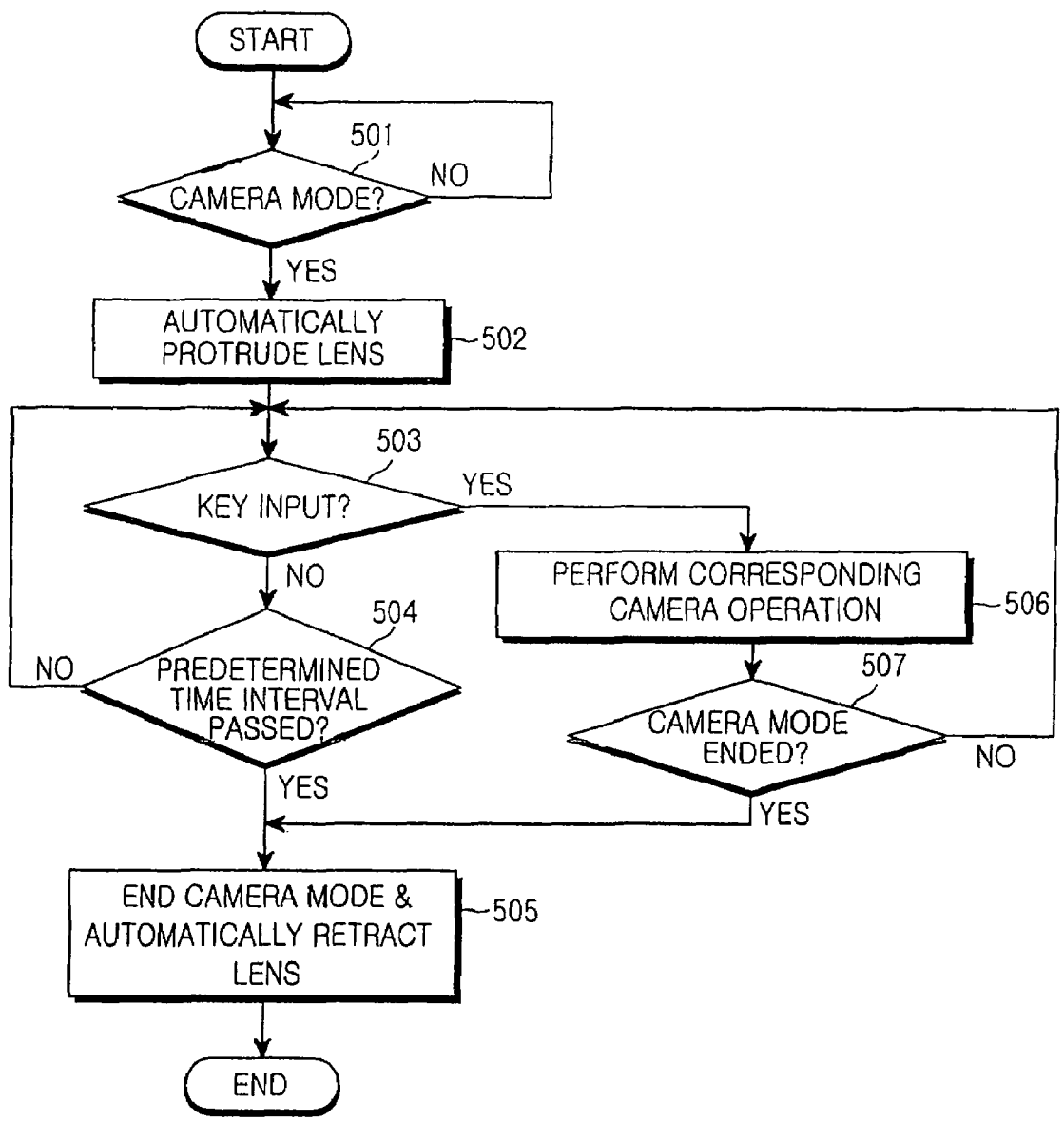
FIG. 5 is a flowchart of a method for controlling the lens unit in the camera mode of the portable terminal according to the first embodiment of the present invention.

FIG. 5 is a flowchart of a method for controlling the lens unit in the camera mode of the portable terminal according to the first embodiment of the present invention.

In the following description, reference will also be made to FIG. 1.

Referring to FIG. 5, when the user of the portable terminal selects a photographing key on the menu or inputs a hot key for the camera mode for more than a predetermined time interval, the controller 110 detects the selection of the camera mode at step 501 and changes the mode of the portable terminal to the camera mode. Simultaneously with the mode transition into the camera mode, the controller 110 controls the lens unit 145 of the camera module 140 to be automatically drawn out of the terminal at step 502.

When no operation (e.g. key input) is performed during more than a predetermined time interval in the camera mode in which the lens unit 145 has been drawn out, the controller 110 detects it at steps 503 and 504 and ends the camera mode and controls the lens unit 145 to be automatically retracted at step 505. However, when an operation (e.g. key input) is performed before a predetermined time interval passes in the camera mode in which the lens unit 145 has been drawn out, the controller 110 detects it at step 503 and allows a corresponding camera operation at step 506. When a camera-mode-end key is input while the corresponding camera operation is performed, the controller 110 detects it at step 507 and ends the camera mode while controlling the lens unit 145 to be automatically retracted at step 505.

Figure 6:
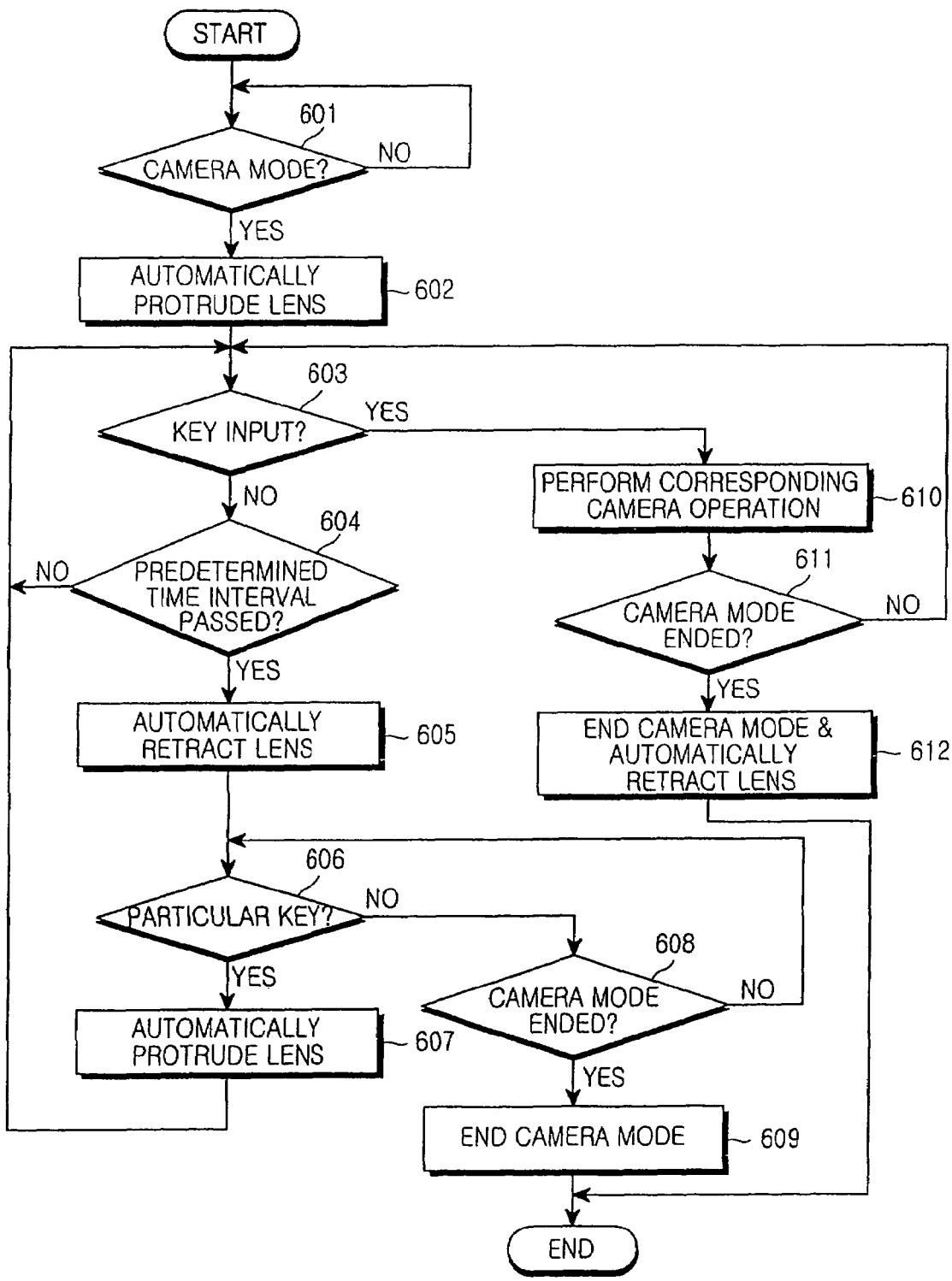
FIG. 6 is a flowchart of a method for controlling the lens unit and the sliding key input unit in the camera mode of the portable terminal according to the second embodiment of the present invention.

FIG. 6 is a flowchart of a method for controlling the lens unit and the sliding key input unit in the camera mode of the portable terminal according to the second embodiment of the present invention.

In the following description, reference will also be made to FIG. 1.

Referring to FIG. 6, when the user of the portable terminal selects a photographing key on the menu or inputs a hot key for the camera mode for more than a predetermined time interval, the controller 110 detects the selection of the camera mode at step 601 and changes the mode of the portable terminal to the camera mode. Simultaneously with the mode transition into the camera mode, the controller 110 controls the lens unit 145 of the camera module 140 to be automatically drawn out of the terminal at step 602.

When no operation (e.g. key input) is performed during more than a predetermined time interval in the camera mode in which the lens unit 145 has been drawn out, the controller 110 detects it at steps 603 and 604 and controls the lens unit 145 to be automatically retracted while maintaining the camera mode at step 605. When a particular key is input in the camera mode in which the lens unit 145 has been retracted, the controller 110 detects it at step 606, controls the lens unit 145 to be automatically drawn out of the terminal at step 607, and then returns to step 603 in which the controller 110 waits for a camera operation. In the camera mode in which the lens unit 145 is retracted also, the controller 110 can perform the camera operation. When the user selects the camera-mode-end key in the camera mode in which the lens unit 145 has been retracted, the controller 110 detects the key input at step 608 and then ends the camera mode at step 609.

However, when an operation (e.g. key input) is performed before a predetermined time interval passes in the camera mode in which the lens unit 145 has been drawn out, the controller 110 detects it at step 603 and allows a corresponding camera operation at step 610. When the camera-mode-end key is input while the corresponding camera operation is performed, the controller 110 detects it at step 611 and ends the camera mode while controlling the lens unit 145 to be automatically retracted at step 612.

Figure 7:
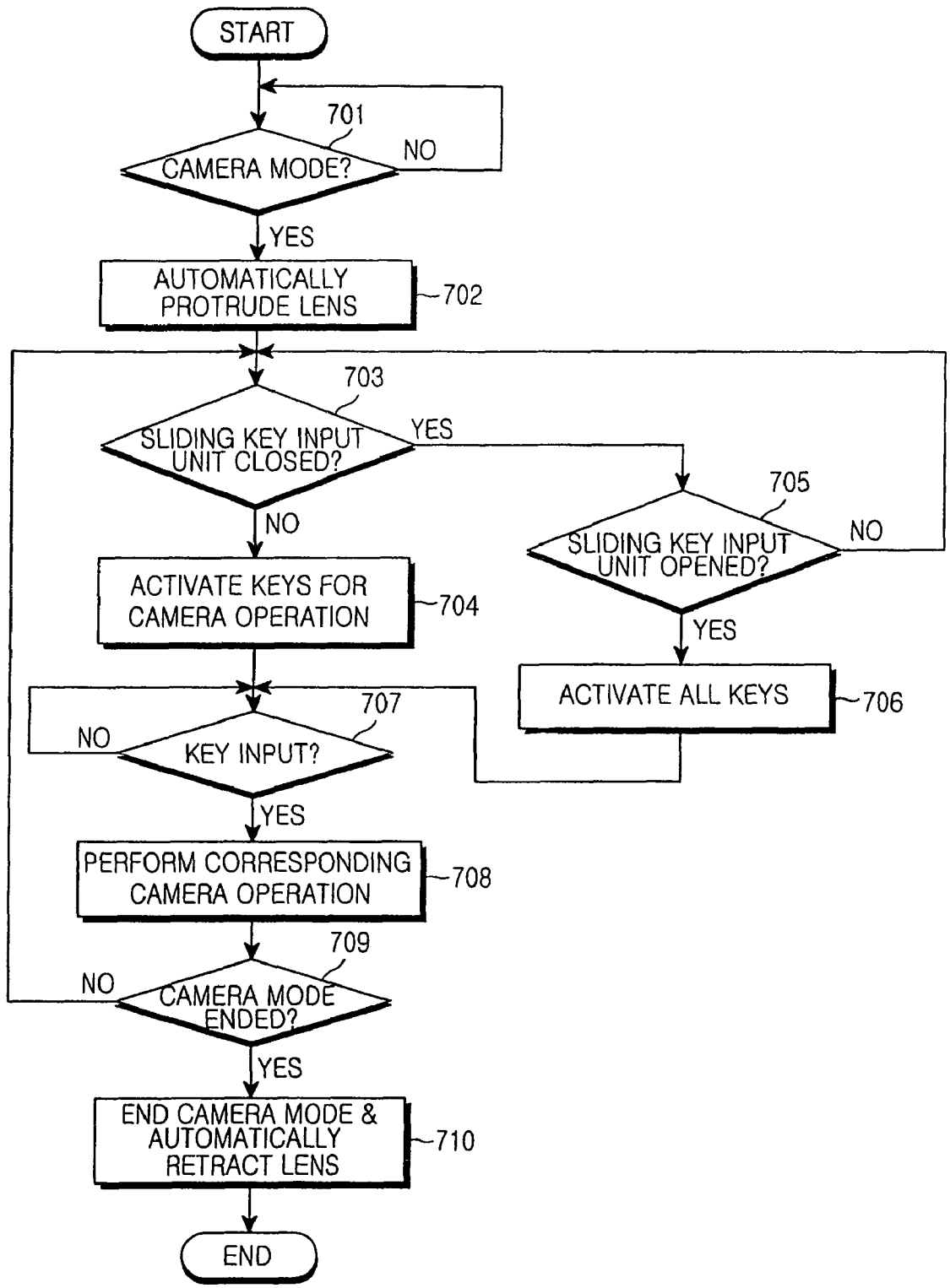
FIG. 7 is a flowchart of a method for controlling the sliding key input unit in the camera mode of the portable terminal according to an embodiment of the present invention.

FIG. 7 is a flowchart of a method for controlling the sliding key input unit in the camera mode of the portable terminal according to an embodiment of the present invention.

In the following description, reference will also be made to FIG. 1.

Referring to FIG. 7, when the user of the portable terminal selects a photographing key on the menu or inputs a hot key for the camera mode for more than a predetermined time interval, the controller 110 detects the selection of the camera mode at step 701 and changes the mode of the portable terminal to the camera mode. Simultaneously with the mode transition into the camera mode, the controller 110 controls the lens unit 145 of the camera module 140 to be automatically drawn out of the terminal at step 702. In the camera mode, the controller 110 determines the status of the sliding key input unit of the key input unit 127.

When the sliding key input unit has slid and been closed, the controller 110 detects the closing at step 703 and proceeds to step 704. At step 704, the controller 110 may activate only the keys for the camera mode operation in the camera mode (e.g. a menu key and a direction key) from among the keys in the sliding key input unit, so that only the activated keys can be operated. The menu key may display various kinds of effects which can be set up in the camera mode. Via the menu key, the kinds of effects can be selected by operating the direction key. However, when the sliding key input unit has slid and been opened, the controller 110 detects the opening at step 705 and then activates all keys in the sliding key input unit and the fixed key input unit located under the sliding key input unit at step 706.

When an operation such as key input is performed after the status of the sliding key input unit is determined, the controller 110 detects the operation at step 707 and performs a corresponding camera operation at step 708. When the camera-mode-end key is input while the corresponding camera operation is performed in the camera mode, the controller 110 detects the key input at step 709 and controls the lens unit 145 to be automatically drawn into the terminal while ending the camera mode at step 710.

According to the present invention, a use can select keys to be activated based on the status of the sliding key input unit in the camera mode. The user may activate only the keys for the camera operation regardless of the status of the sliding key input unit.

The embodiments of the present invention described above are based on various cases in which a call for communication is received. However, the embodiments of the present invention can be applied to the cases where reception of a message is reported.

Therefore, according to embodiments of the present invention, the lens unit is automatically controlled according to a call reception in a camera mode of a portable terminal, thereby eliminating such an inconvenience to manually retract the lens unit into the portable terminal in order to communicate. Further, if the user selects the camera mode after the communication, the lens unit is automatically drawn out of the terminal. In this case, the user can select either the previous camera mode or the initial camera mode.

Further, by controlling the lens unit according to the types of camera modes in the portable terminal, the lens unit can be automatically drawn out of the terminal when the mode of the terminal is shifted to the camera mode and automatically drawn into the terminal when the camera mode is ended. Further, when the sliding key input unit is closed in the camera mode of the portable terminal, only the keys for the camera operation can be activated, so as to prevent unwanted keys from being input.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling a camera mode of a portable terminal, the method comprising the steps of:
    determining a status of a sliding key input unit of the portable terminal when the portable terminal mode is transitioned into the camera mode;
    activating only keys for a camera operation provided in the sliding key input unit when the sliding key input unit is closed;
    activating all keys provided in the sliding key input unit and a fixed key input unit located under the sliding key input unit when the sliding key input unit is open;
    controlling the lens unit to be automatically drawn out to protrude from the portable terminal when the portable terminal mode is transitioned into the camera mode; and determining a status of a sliding key input unit of the portable terminal when the portable terminal mode is transitioned into the camera mode;

activating only keys for a camera operation provided in the sliding key input unit when the sliding key input unit is closed;

activating all keys provided in the sliding key input unit and a fixed key input unit located under the sliding key input unit when the sliding key input unit is open; and controlling the lens unit to be automatically retracted into the portable terminal when the camera mode is terminated.

2. A method for controlling a camera mode of a portable terminal, the method comprising the steps of:

controlling the lens unit to be automatically drawn out to protrude from the portable terminal when the portable terminal mode is transitioned into the camera mode;

determining a status of a sliding key input unit of the portable terminal;

activating only keys for a camera operation provided in the sliding key input unit when the sliding key input unit is closed;

activating all keys provided in the sliding key input unit and a fixed key input unit located under the sliding key input unit when the sliding key input unit is open; and interrupting the camera mode and controlling the lens unit to be automatically retracted into the portable terminal when no operation is performed during a predetermined time interval in the camera mode.

3. A method for controlling a camera mode of a portable terminal, the method comprising the steps of:

controlling the lens unit to be automatically drawn out to protrude from the portable terminal when the portable terminal mode is transitioned into the camera mode;

determining a status of a sliding key input unit of the portable terminal;

activating only keys for a camera operation provided in the sliding key input unit when the sliding key input unit is closed;

activating all keys provided in the sliding key input unit and a fixed key input unit located under the sliding key input unit when the sliding key input unit is open;

interrupting the camera mode and controlling the lens unit to be automatically retracted n into the portable terminal when no operation is performed during a predetermined time interval in the camera mode; and controlling the lens unit to be automatically retracted into the portable terminal when a camera-mode-end key is selected in the camera mode.

4. A method for controlling a camera mode of a portable terminal, the method comprising the steps of:

controlling the lens unit to be automatically drawn out to protrude from the portable terminal when the portable terminal mode is transitioned into the camera mode;

determining a status of a sliding key input unit of the portable terminal;

activating only keys for a camera operation provided in the sliding key input unit when the sliding key input unit is closed;

activating all keys provided in the sliding key input unit and a fixed key input unit located under the sliding key input unit when the sliding key input unit is open; and controlling the lens unit to be automatically retracted into the portable terminal while maintaining the camera mode when no operation is performed during a predetermined time interval in the camera mode.

5. The method as claimed in claim 4, further comprising the step of controlling the lens unit to be automatically drawn out of the portable terminal when a particular key is input in the camera mode in which the lens unit has been retracted in the portable terminal.

6. A method for controlling a camera mode of a portable terminal, the method comprising the steps of:

controlling the lens unit to be automatically drawn out to protrude from the portable terminal when the portable terminal mode is transitioned into the camera mode;

determining a status of a sliding key input unit of the portable terminal;

activating only keys for a camera operation provided in the sliding key input unit when the sliding key input unit is closed;

activating all keys provided in the sliding key input unit and a fixed key input unit located under the sliding key input unit when the sliding key input unit is open;

controlling the lens unit to be automatically retracted into the portable terminal while maintaining the camera mode when no operation is performed during a predetermined time interval in the camera mode; and controlling the lens unit to be automatically retracted into the portable terminal when a camera-mode-end key is selected in the camera mode.

* * * * *